Sept. 11, 1962 J. N. PRESTON 3,053,048
FIRE JET TORQUE AND PROPULSION REACTION ENGINE
Filed Feb. 2, 1961 2 Sheets-Sheet 1

James N. Preston

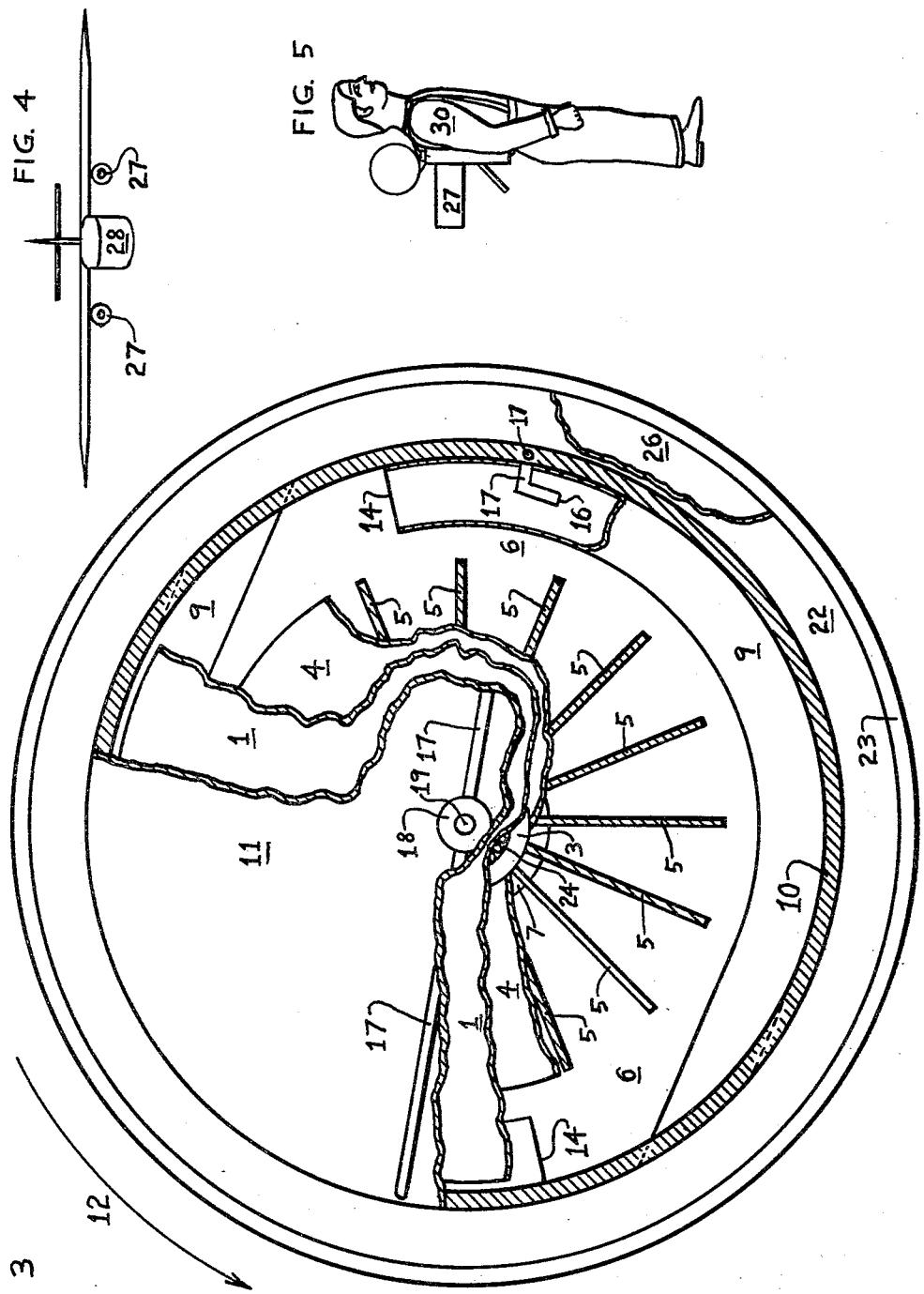

United States Patent Office 3,053,048
Patented Sept. 11, 1962

3,053,048
FIRE JET TORQUE AND PROPULSION
REACTION ENGINE
James N. Preston, 1633 W. Campbell, Phoenix 15, Ariz.
Filed Feb. 2, 1961, Ser. No. 86,669
3 Claims. (Cl. 60—39.35)

This invention is a reaction engine that is designed to produce both torque and thrust for use as a lightweight, heavy duty engine to power any kind of aircraft, industrial, automotive, or marine equipment. This engine is self cooling as the combustion cylinders are surrounded on three sides by the compressed air chamber and overheating is not a problem as it is to a turbine driven engine. Compressed air from the air impeller vanes cools the outside of the combustion cylinders before entering the combustion cylinders in a preheated condition.

This engine is unique in that it derives its torque horsepower from the direct reaction of the combustion gases exhausting from the combustion cylinders at the exhaust port and requires no turbine to remain in the superheated exhaust gases to drive the engine rotor assembly. The design of this engine prevents any of its component parts from being melted or burned up by the super-heated exhaust gases and at the same time produces torque horsepower more efficiently with less engine weight and with less fuel consumption per horsepower unit delivered than a turbine driven engine. It is designed to produce torque horsepower efficiently enough to be used as a flying belt by strapping a small, lightweight engine propulsion unit to the back of a human being.

FIG. 3 shows the rear view of the engine when the front view is rotated 180 degrees on its vertical axis.

FIG. 4 shows the front view of the engine as it is mounted to an aircraft that is propelled through the air by the engine.

FIG. 5 shows the side view of the engine as it is strapped to the back of a human being who is being propelled through the air by the engine.

Figure 1:
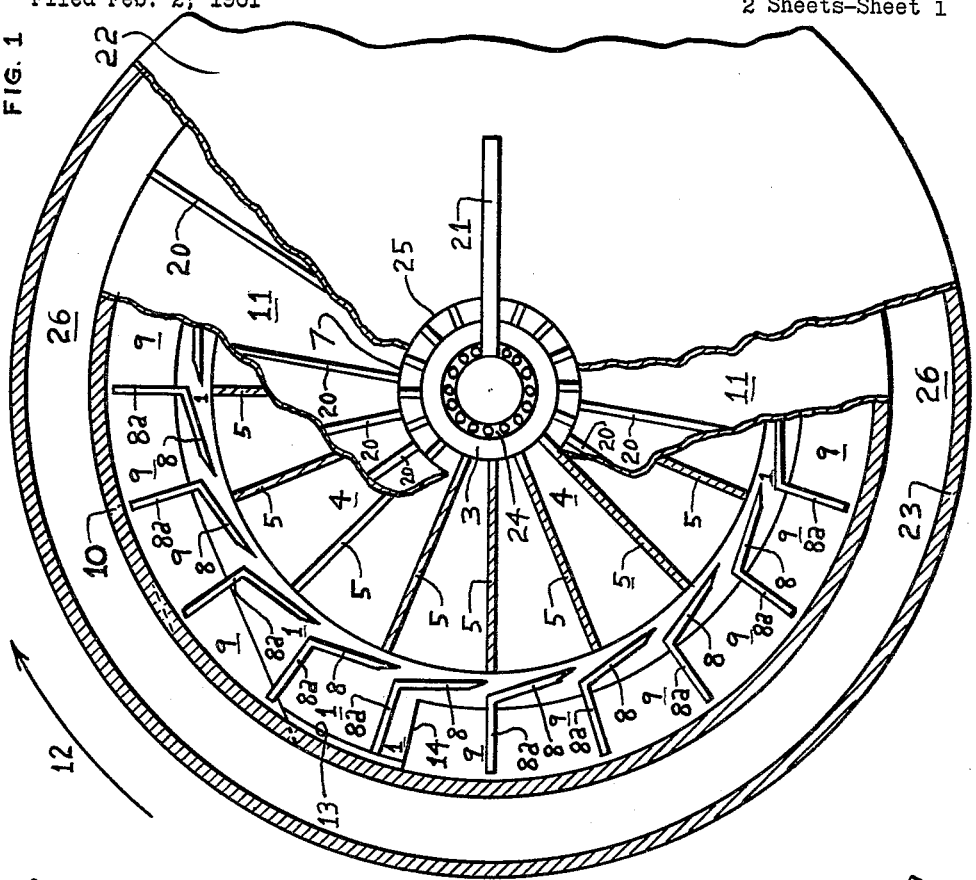
FIG. 1 shows the front view of the engine.
Figure 2:
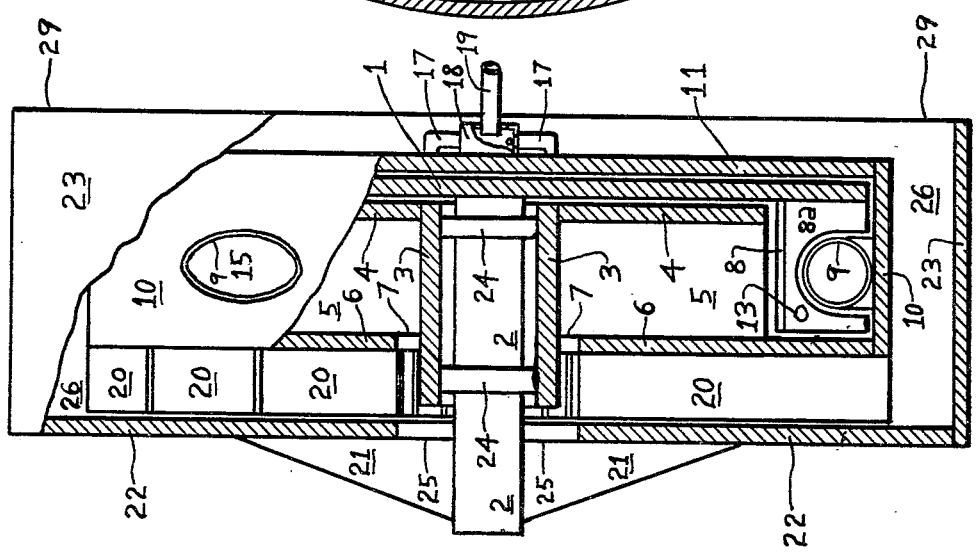
FIG. 2 shows the side view of the engine when the front view of the engine is rotated 90 degrees to its right vertical axis.

Referring to the drawing in more detail, 1 generally indicates the stationary air deflector disc which is centered to the axis of the right circular stationary axle 2 and affixed at its adjacent face to the right circular end of the stationary axle 2 in a plane perpendicular to the axis of the stationary axle 2.

The right circular cylindrical hub 3 rotates on the bearings 24 around the perimeter of the smaller diameter concentric stationary axle 2 at the end of the stationary axle 2 adjacent to the stationary air deflector disc 1. The basic air impeller disc 4 is centered around and affixed to the outer perimeter of the hub 3 in a plane perpendicular to the axis of the stationary axle 2 at the end of the hub 3 which is adjacent to the stationary air deflector disc 1.

A number of air impeller vanes 5 are radially affixed to the face of the basic ar impeller disc 4, each vane 5 extending perpendicular from the face of the basic air impeller disc 4 for a distance. Each vane 5 is affixed at its axis-toward end to the outer face of the hub 3, in a line parallel to the axis of the stationary axle 2 and extends radially outward to the perimeter of the basic air impeller disc 4.

The second air impeller disc 6 has the combustion air intake port 7 cut out of its center and is centered around the hub in a plane perpendicular to the axis of the stationary axle 2. The adjacent face of said second air impeller disc 6 is affixed to the adjacent sides of the air impeller vanes 5 to oppose the basic air impeller disc 4.

The radius of the second air impeller disc 6 is greater than the radius of the basic air impeller disc 4.

The right circular perimeter housing cylinder 10 is affixed at one right circular end to the perimeter of the second air impeller disc 6 and extends for a distance in a line horizontally parallel to the axis of the stationary axle 2, across the plane of the air impeller vanes 5, the basic air impeller disc 4, and beyond the plane of the stationary air deflector disc 1. The perimeter of the housing cylinder end disc 11 is affixed to the right circular open end of said perimeter housing cylinder 10.

The hub 3, the basic air impeller disc 4, the air impeller vanes 5, the second air impeller disc 6, the perimeter housing cylinder 10, and the housing cylinder end disc 11, rotate as an integral assembly, clockwise 12, on the bearings 24 around the stationary axle 2 and stationary air impeller disc 1.

The combustion intake air reaches the air impeller vanes 5 through the combustion air intake port 7 that is cut through the center of the second air impeller disc 6. The air is impelled through centrifugal force by the air impeller vanes 5 outward into the air compression chamber 13 where it is stopped from rotating and retained under compression by the stationary air deflector vanes 8 and the air brake vanes 8a for use by the combustion cylinders 9.

The stationary air deflector disc 1 has a greater radius than the parallel adjacent basic air impeller disc 4 and air impeller vanes 5. A number of overlapping air deflector vanes 8 are affixed perpendicular to the face of the stationary air deflector disc 1 just outside the perimeter of the basic air impeller disc 4 and air impeller vanes 5; each vane 8 extending horizontally across the basic air impeller disc 4 and the air impeller vanes 5 to a line near the inside face of the second air impeller disc 6. The counterclockwise edge of each stationary air deflector vane 8 is closely adjacent and tangent to the perimeter of the basic air impeller disc 4 and the air impeller vanes 5; each vane 8 extending in a tangent clockwise 12 direction until it overlaps the next clockwise adjacent air deflector vane 8. At the point of overlap, the air deflector vane 8 is bent outward at an angle to form the air brake vane 8a which extends on a radial line away from the axis of the stationary axle 2 and perpendicular to the face of the stationary air deflector disc 1 to a line near the inner face of the perimeter housing cylinder 10. Hence the air impelled through centrifugal force by the air impeller vanes 5 follows the tangent stationary air deflector vanes 8 and is then stopped from rotating by the air brake vanes 8a within the air compression chamber 13 which is bounded by the stationary air deflector vanes 8, the second air impeller disc 6, the perimeter housing 10, and the housing cylinder end disc 11.

The non-rotating air pressure in the air compression chamber 13 is built up by the rotating air impeller assembly for use by the combustion cylinders 9 which are affixed to the inner face of the perimeter housing cylinder 10 within the air compression chamber 13 in a plane parallel adjacent to the second air compressor disc 6. A section of each air brake vane 8a must be cut of its outward edge facing the inner face of the perimeter housing cylinder 10 to allow room for the combustion cylinders 9 within the air compression chamber 13. The only air outlets from the air compression chamber 13 are out through the air intake ports 14 into the combustion cylinders 9. Each combustion cylinder 9 has its air intake port 14 at its clockwise 12 end and extends in a circular counter-clockwise direction for a distance around the inner face of the perimeter housing cylinder 10 to a point where it becomes tangent to the perimeter housing cylinder 10 and extends through the perimeter housing cylinder 10 to allow the combustion gases to exhaust.

The fuel pipe 17 extends through the perimeter housing cylinder 10 and through each combustion cylinder 9 into the center of each combustion cylinder 9 at a counter-clockwise distance from each combustion air intake port 14. At the center of each combustion cylinder 9, said fuel pipe 17 is bent in a counter-clockwise direction to face towards the exhaust port 15; the fuel enters the combustion cylinders 9 at the fuel intake jet 16. The fuel pipe 17 leads from the fuel intake cup 18 which is affixed to the center of the outer face of the housing cylinder end disc 11. The fuel intake cup 18 receives fuel from the stationary fuel pipe 19 and distributes it to each fuel pipe 17 which delivers it into each combustion cylinder 9 at the fuel intake jet 16.

The fuel mixes with the incoming compressed air and the ignited and expanding combustion gases exhaust from the exhaust port 15 of each combustion cylinder 9 in a counter-clockwise direction and imparts a clockwise 12 torque to each integral combustion cylinder 9 and perimeter housing cylinder 10 and impeller assembly to accelerate the clockwise 12 rotation of said integral assembly on bearings 24 around the stationary axle 2.

A number of propulsion air impeller vanes 20 are radially affixed to the outer face of the second air impeller disc 6, extending perpendicular from the face of said disc 6 for a distance and extends radially outward from the perimeter of the circular air intake port 7 to the perimeter housing cylinder 10.

A number of radial braces 21 are affixed to, and extend radially outward from, the stationary axle 2, to hold the propulsion housing base disc 22 centered on the stationary axle 2 in a plane perpendicular to the axis of the stationary axle 2 and adjacent to the propulsion air impeller vanes 20. Said propulsion housing base disc 22 has the circular air intake port 25 cut out of its center to allow air to reach the propulsion air impeller vanes 20 and the air intake port 7. The radius of said propulsion housing base disc 22 is greater than the radius of the second air impeller disc 6 and perimeter housing cylinder 10.

The right circular end of the right circular propulsion housing cylinder 23 is affixed to the perimeter of the propulsion housing base disc 22 and extends for a distance on a horizontal line parallel to the axis of the stationary axle 2, to a line beyond the plane of the housing cylinder end disc 11. The propulsion housing cylinder 23 has a greater radius than the smaller concentric perimeter housing cylinder 10 leaving the propulsion chamber 26 between the two concentric cylinders with the propulsion exhaust port 29 at the open end opposite the propulsion housing base disc 22. The propulsion housing cylinder 23 channels the propulsion air from the propulsion air impellers 20 and the combustion exhaust gases from the exhaust port 15 to the rear of the engine to exhaust from the propulsion chamber 26 at the propulsion exhaust port 29 for the purpose of propelling any affixed equipment or vehicle through the air.

FIG. 4 shows the front view of the engine 27 as it is mounted to an aircraft for the purpose of propelling said aircraft 28 through the air.

FIG. 5 shows the side view of the engine 27 as it is strapped to the back of a human being 30 who is propelled through the air by said engine 27.

I claim:

1. An air compression chamber consisting of a stationary air deflector disc which is centered around, and affixed at its adjacent face to, the right circular end of a right circular stationary axle; a right circular cylindrical hub rotates on bearings around the periphery of the stationary axle and is closely adjacent at one end to the stationary air deflector disc; a basic air impeller disc adjoins the periphery of the hub in a plane perpendicular to the axis of the stationary axle and extends outward in a plane closely parallel adjacent to the stationary air deflector disc to a perimeter having a radius somewhat smaller than that of the stationary air deflector disc; a number of air impeller vanes are radially affixed to the face of the basic air impeller disc, each said vane extending from the periphery of the hub outward to a perimeter having a radius equal to that of the basic air impeller disc and along a line parallel to the axis of the stationary axle for a distance to adjoin a second air impeller disc located in a plane parallel adjacent to the plane of the basic air impeller disc; the second air impeller disc has a circular combustion air intake port cut out of its axial center and extends outward to a perimeter having a radius somewhat greater than that of the stationary air deflector disc; a right circular perimeter housing cylinder is affixed at one right circular end to the periphery of the second air impeller disc and extends for a distance along a line horizontally parallel to the axis of the stationary axle, across the plane of the air impeller vanes, the basic air impeller disc, and beyond the plane of the stationary air deflector disc to adjoin the periphery of a housing cylinder end disc which is centered on, in a plane perpendicular to, the axis of the stationary axle; the hub, the basic air impeller disc, the air impeller vanes, the second air impeller disc, the perimeter housing cylinder, and the housing cylinder end disc rotate as an integral assembly, clockwise, on bearings around the periphery of the stationary axle; the combustion intake air reaches the air impeller vanes through the combustion air intake port and is impelled clockwise by the air impeller vanes and outward by centrifugal force into an air compression chamber adjoining the axis-toward face of the perimeter housing cylinder where it is retained under compression by a number of overlapping stationary air deflector vanes which prevent it from freely rotating further with the air impeller vanes; said overlapping air deflector vanes are affixed perpendicular to the adjacent face of the stationary air deflector disc along a perimeter having a radius slightly greater than has the periphery of the basic air impeller disc and air impeller vanes; each air deflector vane extends closely horizontally adjacent across the plane of the basic air impeller disc and air impeller vanes to a line in a plane closely parallel adjacent to the adjacent face of the second air impeller disc; the counter-clockwise edge of each air deflector vane is closely adjacent to the periphery of the basic air impeller disc and air impeller vanes and extends in a generally tangent clockwise direction until it overlaps the next clockwise adjacent air deflector vane; the combustion intake air, impelled clockwise by the air impeller vanes and outward by centrifugal force, is deflected outward by the ring of air deflector vanes into the air compression chamber which is bounded by the stationary air deflector vanes, the second air impeller disc, the perimeter housing cylinder, and the housing cylinder end disc.

2. The invention as claimed in claim 1 wherein a number of propulsion air impeller vanes extend perpendicular from the outer face of the second air impeller disc for a distance to a line in a plane closely parallel adjacent to the face of a propulsion housing base disc and radially outward from the perimeter of the combustion air intake port to a perimeter having a radius equal to that of the perimeter housing cylinder; the propulsion housing base disc is centered about, and extends outward in a plane perpendicular to, the axis of the stationary axle to a perimeter having a radius somewhat greater than that of the second air impeller disc and is held in position by a number of adjoining radial braces which are affixed to the stationary axle; a circular air intake port is cut through the axial center of the propulsion housing base disc to allow intake air to reach the propulsion air impeller vanes and the combustion air intake port; a right circular propulsion housing cylinder is affixed around the periphery of the propulsion housing base disc and extends along a line parallel to the axis of the stationary axle, across the plane of the propulsion air impeller vanes, the perimeter housing cylinder, and the housing cylinder end disc; said propulsion housing cylinder, having a greater radius than that of the perimeter housing cylinder, leaves a propulsion chamber between the two concentric cylinders with a propulsion exhaust port at the open end opposite the propulsion housing base disc; the propulsion chamber channels the propulsion air from the periphery of the air impeller vanes and combustion exhaust gases through the propulsion exhaust port for the purpose of providing propulsion thrust.

3. A reaction engine comprising; a perimeter housing cylinder provided which rotating around its axis and mounted normally on a hub which rotating on bearings around the axis of an axle; an air compression chamber provided which contained within said perimeter housing cylinder by means of a second air impeller disc which affixed concentrically to one side of said perimeter housing cylinder, a housing cylinder end disc which affixed concentrically to the opposite side of said perimeter housing cylinder, and a basic air impeller disc which mounted concentrically to the hub within said air compression chamber at an axial distance from said second air impeller disc; a combustion air intake port provided at the axial center of said second air impeller disc for the purpose of allowing air into said air compression chamber; a plurality of air impeller vanes provided which radially affixed within said air compression chamber and in connection with a face of the basic air impeller disc and an opposing face of the second air impeller disc for the purpose of compressing air into said air compression chamber when the perimeter housing cylinder being rotated around its axis; a stationary air deflector disc provided within said air compression chamber and concentrically mounted to the axle in a plane adjacent to the basic air impeller disc; a plurality of stationary air deflector vanes provided within said air compression chamber and affixed to said air deflector disc; each said stationary air deflector vane extending axially across the plane of the air impeller vanes closely adjacent to the periphery of said air impeller vanes and in a general tangent direction for an arc distance for the purpose of deflecting compressed air from said air impeller vanes into said air compression chamber; a number of combustion cylinders provided within said air compression chamber and affixed generally on their outer sides to the axis-toward side of the perimeter housing cylinder; each said combustion cylinder provided with a generally circular cross-section area when as extending from an air intake port at one end in a general circular direction around the axis of the axle for an arc distance wherefrom extending through the perimeter housing cylinder at an exhaust port in a general tangent direction for the purpose of exhausting fluid, normally ignited and expanding combustion gases, into an adjacent concentrically located propulsion chamber which directing said fluid in an axial direction; each said exhaust port and combustion cylinder each provided with a substantially larger cross-section area than that of each air intake port; thermal energy provided within each said combustion cylinder for the purpose of providing fluid expansion to compressed air within each said combustion cylinder and the air compression chamber; any combustible fuel being forced generally by pump means into a volume of compressed air within each said combustion cylinder wherein ignited by ignition means thereby providing a larger fluid volume to said compressed air continually flowing through each air intake port into each said combustion cylinder; said larger fluid volume providing a fluid pressure and velocity at each exhaust port approximately equal to that of said compressed air within said air compression chamber and air intake port before being dissipated in each said combustion cylinder; the continuous exhausting of said larger fluid volume from each said exhaust port providing a reaction pressure which rotating the perimeter housing cylinder and air impeller vanes around the axis of the axle which providing continuous air compression into the air compression chamber which continuing the cycle which providing continuous torque and propulsion thrust; thermal energy within each combustion cylinder furthermore providing fluid expansion of compressed air within the air compression chamber by means of heat exchange through the walls of each said combustion cylinder thereby providing additional efficiency of the engine to utilize thermal energy of fuel for torque and propulsion thrust purposes and providing a cooling effect to each combustion cylinder and the engine.

References Cited in the file of this patent
UNITED STATES PATENTS 2,499,863    Hart _____ Mar. 7, 1950
2,594,629    Exner _____ Apr. 29, 1952